United States Patent
Ghabra et al.

(10) Patent No.: US 7,295,849 B2
(45) Date of Patent: Nov. 13, 2007

(54) VEHICLE TWO WAY REMOTE COMMUNICATION SYSTEM

(75) Inventors: Riad Ghabra, Dearborn Heights, MI (US); Qingfeng Tang, Novi, MI (US); John S. Nantz, Brighton, MI (US); Yi Luo, Detroit, MI (US)

(73) Assignee: Lear Corporation, Southfield, MI (US)

( * ) Notice: Subject to any disclaimer, the term of this patent is extended or adjusted under 35 U.S.C. 154(b) by 841 days.

(21) Appl. No.: 10/738,081

(22) Filed: Dec. 17, 2003

(65) Prior Publication Data
US 2005/0134477 A1   Jun. 23, 2005

(51) Int. Cl.
*H04B 7/00* (2006.01)
(52) U.S. Cl. .................. 455/502; 340/309.4
(58) Field of Classification Search ........ 455/502, 455/127.5, 208, 343.1, 73, 574; 340/5.61, 340/5.63, 5.64, 681, 693.3, 309.7, 8, 938.3, 340/7.32, 318, 309.16, 393.4, 309.15, 539.3
See application file for complete search history.

(56) References Cited

U.S. PATENT DOCUMENTS

| | | | |
|---|---|---|---|
| 5,115,236 A | 5/1992 | Köhler | |
| 5,203,020 A | 4/1993 | Sato et al. | |
| 5,305,459 A | 4/1994 | Rydel | |
| 5,606,739 A | 2/1997 | Goto | |
| 5,838,257 A | 11/1998 | Lambropoulos | |
| 6,236,850 B1 | 5/2001 | Desai | |
| 6,323,566 B1 | 11/2001 | Meier | |
| 7,050,947 B2 * | 5/2006 | Selektor | 702/189 |
| 2001/0010491 A1 | 8/2001 | Marneweck et al. | |
| 2003/0048176 A1 | 3/2003 | Selektor et al. | |
| 2003/0067398 A1 | 4/2003 | Leichtfried et al. | |

FOREIGN PATENT DOCUMENTS

| | | |
|---|---|---|
| EP | 0787875 A2 | 6/1997 |
| EP | 1002705 | 5/2000 |
| EP | 1006249 | 6/2000 |
| WO | WO 95/27273 A1 | 10/1995 |

* cited by examiner

*Primary Examiner*—Edward F. Urban
*Assistant Examiner*—Tu X. Nguyen
(74) *Attorney, Agent, or Firm*—MacMillan, Sobanski & Todd, LLC

(57) ABSTRACT

A two way remote communication system for a vehicle includes a fob portion and a vehicle portion. The fob portion includes a fob battery, a fob transceiver, at least one button and at least one display. The vehicle portion includes a vehicle battery, a vehicle transceiver, and at least one electrical component. The timers are synchronized to simultaneously activate and deactivate the transceivers to establish periodic time intervals when the fob transceiver is open to transmission, which establishes idle time for the fob transceiver and reduces the amount of power consumed by the fob battery.

20 Claims, 4 Drawing Sheets

VEHICLE TWO WAY REMOTE COMMUNICATION SYSTEM

CROSS REFERENCE TO RELATED APPLICATIONS

Not Applicable.

STATEMENT REGARDING FEDERALLY SPONSORED RESEARCH

Not Applicable.

BACKGROUND OF THE INVENTION

The present invention relates generally to remote keyless entry systems for vehicles and, in particular, to a two way remote communication system for a vehicle.

Remote keyless entry systems are well known and typically include a key fob having a transmitter carried by a person that communicates with a receiver assembly in the vehicle. Recent improvements to remote keyless entry systems include two-way communication functionality utilizing respective transmitter/receiver assemblies (i.e., transceivers) in the vehicle and the key fob. Many of these systems, while providing enhanced and desirable features, disadvantageously tend to draw too much power from the fob battery due to the increased power requirements of a transceiver, resulting in a decreased fob battery life and decreased customer satisfaction.

It is desirable, therefore, to provide a remote communication system for a vehicle having two-way communication functionality between the vehicle and the key fob that also provides a fob battery power saving feature.

SUMMARY OF THE INVENTION

A two way remote communication system for a vehicle in accordance with the present invention includes a key fob having an electrical power source, such as a battery or the like, and a fob transceiver that is operable to transmit and receive electrical signals disposed in the key fob and electrically connected to the fob battery. At least one button is disposed in the key fob and is electrically connected to the fob transceiver. The button is operable to initiate a transmission of a command by the fob transceiver. A fob timer is electrically connected to the fob transceiver and the fob battery. The communication system also includes a vehicle having an electrical power source, such as a battery or the like. A vehicle transceiver operable to transmit and receive electrical signals is disposed in the vehicle and is electrically connected to the vehicle battery. At least one electrical component is electrically connected to the vehicle transceiver and is operable to receive signals from and transmit commands to the vehicle transceiver. A vehicle timer is electrically connected to the vehicle transceiver and the vehicle battery. The fob and vehicle transceivers are operable to transmit and receive electrical signals in response to commands transmitted by the at least one button and the at least one electrical component. The fob and vehicle timers are synchronized to simultaneously activate and deactivate the transceivers to establish periodic time intervals when the transceivers are open to transmission, thereby establishing idle time for the transceivers and reducing the amount of power consumed by the fob battery.

The two way remote communication system in accordance with the present invention advantageously provides a remote communication system for a vehicle having two way communication capabilities as well as a power saving feature for the fob battery.

DESCRIPTION OF THE DRAWINGS

The above, as well as other advantages of the present invention, will become readily apparent to those skilled in the art from the following detailed description of a preferred embodiment when considered in the light of the accompanying drawings in which.

DESCRIPTION OF THE PREFERRED EMBODIMENT

Figure 1A:
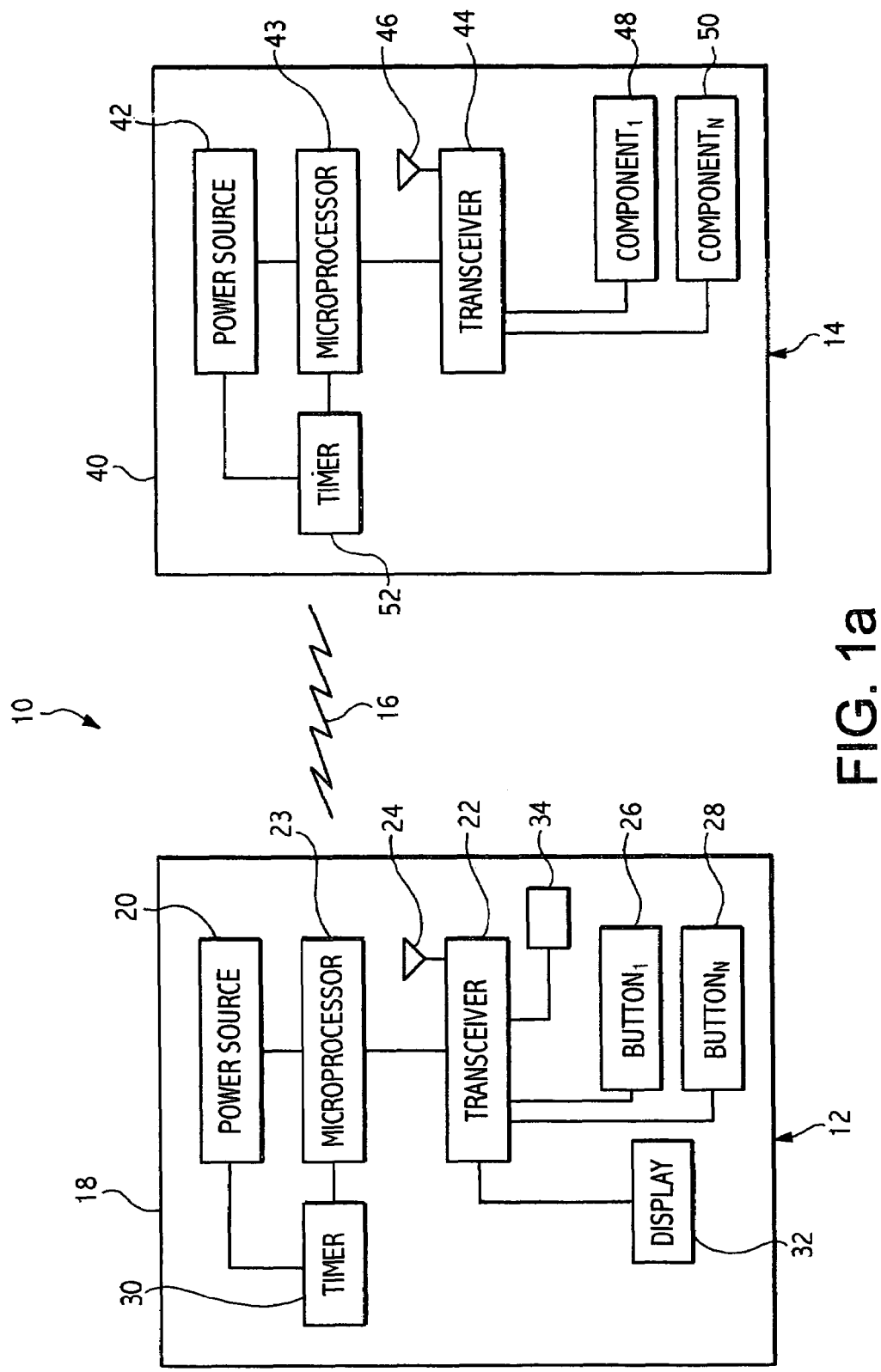
FIGS. 1a and 1b are a schematic view of a communication system in accordance with the present invention.
Figure 1B:
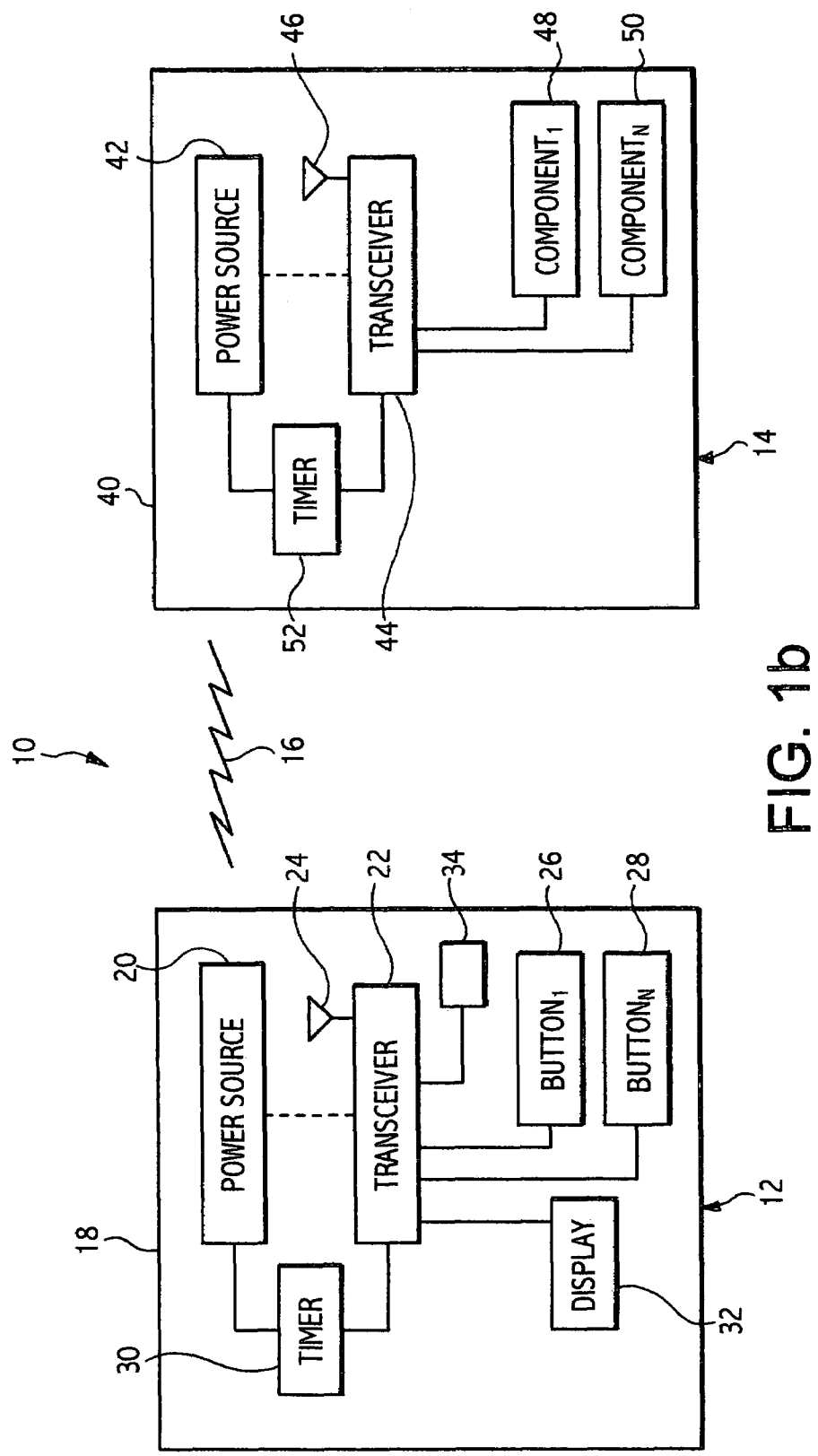

Referring now to FIGS. 1a and 1b, a two way remote communication system in accordance with the present invention is indicated generally at 10. The communication system 10 includes a remote portion, indicated generally at 12 and a vehicle portion, indicated generally at 14. The remote portion 12 and the vehicle portion 14 are operable to communicate with each other, discussed in more detail below via radio frequency waves, indicated generally at 16.

The remote portion 12 of the communication system 10 includes a fob, indicated schematically at 18, having a power source 20, such as a battery or the like, disposed therein. The fob 18 is preferably sized to be held by a human hand and is preferably adapted to be attached to a vehicle key chain (not shown) or the like. A microprocessor 23 is disposed in the fob 18 and is electrically connected to the battery 20. The microprocessor 23 is operable to activate and deactivate a transceiver 22. The transceiver 22 is disposed in the fob 18 and is electrically connected to the microprocessor 23. The transceiver 22 is operable to transmit and receive signals via the radio frequency waves 16 via an integral antenna 24. At least one button 26 is disposed in the fob 18 and is electrically connected to the transceiver 22. Optionally, at least another button 28 is disposed in the fob 18 and is electrically connected to the transceiver 22. A timer 30 is electrically connected to the battery 20 and to the microprocessor 23. The timer 30 is operable to send a signal to the microprocessor 23 to activate and deactivate the transceiver 22 to establish periodic time intervals when the transceiver 22 is open to transmission, discussed in more detail below. A display 32 is electrically connected to the transceiver 22 and is operable to operable to display information received from the transceiver 22. Preferably, the display 32 is a liquid crystal display (LCD). Alternatively, the display 32 is a light emitting diode (LED) display or similar displaying means. Optionally, the microprocessor 23 is removed and the transceiver 22 is operable to activate and deactivate upon receiving a signal from the timer 30, best seen in FIG. 1b.

Preferably, a plurality of buttons, such as the buttons 26 and 28, are disposed in the fob 18 and are electrically connected to the transceiver 22, each of which buttons 26 and 28 has a different function. For example, the buttons 26 and 28 may be, but are not limited to, a button for remote engine start, a button to unlock the vehicle door locks, a button to lock the vehicle door locks, or a vehicle system status check button. Alternatively, a buzzer or a speaker 34 is disposed in the fob 18 and is electrically connected to the transceiver 22. The speaker 34 is operable to receive a signal from the transceiver 22 and to emit a sound upon receiving the signal from the transceiver 22.

The vehicle portion 14 of the communication system 10 includes a vehicle body, indicated schematically at 40, having a power source 42, such as a battery or the like, disposed therein. A microprocessor 43 is disposed in the vehicle body 40 and is electrically connected to the battery 42. The microprocessor 43 is operable to activate and deactivate a transceiver 44. The transceiver 44 is disposed in the vehicle body 40 and is electrically connected to the microprocessor 43. The transceiver 44 is operable to transmit and receive signals via the radio frequency waves 16 via an integral antenna 46. At least one electrical component 48 is disposed in the vehicle body 40 and is electrically connected to the transceiver 44. Alternatively, at least another electrical component 50 is disposed in the vehicle body 40 and is electrically connected to the transceiver 44. A timer 52 is electrically connected to the power source 40 and to the microprocessor 43. The timer 52 is operable to send a signal to the microprocessor 43 to activate and deactivate the transceiver 44 to establish periodic time intervals when the transceiver 44 is open to transmission, discussed in more detail below. Optionally, the microprocessor 43 is removed and the transceiver 44 is operable to activate and deactivate upon receiving a signal from the timer 52, best seen in FIG. 1b.

The electrical components 48 and 50 may be, but are not limited to, electric motors for actuating door locks, door openers, lift gate openers or the like. Alternatively, the electrical components 48 and 50 are vehicle systems, such as, but not limited to, an intruder alert or alarm system, a remote vehicle engine start system, an engine status monitoring system, a vehicle tire pressure monitoring system or similar system.

In operation, the timers 30 and 52 are synchronized at the time of installation of the system 10 such that the timers 30 and 52 send signals to the respective microprocessors 23 and 43 to simultaneously activate and deactivate the respective transceivers 22 and 44, which allows the fob transceiver 22 and the vehicle transceiver 44 to turn on periodically and automatically communicate with each other such as by transmitting a 'handshake' signal or the like. Preferably, the timers 30 and 52 are first synchronized at the time of the installation and programming of the communication system 10, when the fob 18 is mated with the vehicle 40. Preferably, the timers 30 and 52 and the microprocessors 23 and 43 activate the transceivers 22 and 44 for a first predetermined length of time, after which the timers 30 and 52 and the microprocessors 23 and 43 deactivate the transceivers 22 and 44, placing the transceivers 22 and 44 in an idle state. When idle, the transceivers 22 and 44 advantageously consume very little power from the respective batteries 20 and 42, thereby advantageously reducing the amount of power consumed by the fob battery 20. The timers 30 and 52 keep the transceivers 22 and 44 idle for a second predetermined length of time, after which the timers 30 and 52 and the microprocessors 23 and 43 re-activate the transceivers 22 and 44 for the first predetermined length of time, which completes an activation/deactivation cycle. Because the fob transceiver 22 is idle for the second predetermined length of time during the successive activation/deactivation cycles, over the life of the communication system 10, the fob battery 20 consumes less power than in the prior art, thereby increasing the life of the fob battery 20 and increasing customer satisfaction.

Preferably, the transceivers 22 and 44 and/or the microprocessors 23 and 43 track the number of activation/deactivation cycles and, after a predetermined number of activation/deactivation cycles, a synchronization cycle is initiated concurrently with or in place of an activation/deactivation cycle, wherein each of the transceivers 22 and 44 transmit synchronization data. The synchronization data is processed by the respective transceivers 22 and 44 and passed back to the opposite transceiver 22 or 44 in order to ensure that the timers 30 and 52 continue to simultaneously activate and deactivate the respective transceivers 22 and 44. The vehicle transceiver 44 is always on (i.e. listening) but the synchronization is necessary between the transceivers 22 and 44 so that the system 10 may be designed so the vehicle transceiver 44 transmits when the fob transceiver 22 is open for transmission.

In addition, the communication system 10 becomes active if there is a manual engagement of a button 26 or 28. The manual engagement of the button 26 or 28 issues a command from the button 26 or 28 to the fob transceiver 22, which causes the fob transceiver 22 to transmit an initial signal (not shown) that includes query data or information (not shown). Preferably, the query information is information specific to the function of the manually engaged button 26 or 28. Preferably, a fob button 26 or 28 press is followed by a brief delay, which is followed by a period where the fob transceiver 22 is on and transmitting the initial signal. The initial signal is received by the vehicle transceiver 44 which, depending on the type of query information, issues a command to the electrical component 48 or 50. After carrying out the command and in response, the electrical component 48 or 50 transmits status data (not shown) to the vehicle transceiver 44 which, after receiving the status data, transmits a return signal (not shown) including the status data. The fob transceiver 22 receives the return signal, stores the status data, and transmits the status data to the LCD 32, which displays the status data. After transmitting the initial signal, the fob transceiver 22 remains active for a brief predetermined period of time to detect a response (the return signal) from the vehicle transceiver 44.

The timers 30 and 52 may also synchronize when one of the buttons 26 or 28 is pressed. Concurrent with transmitting and receiving the initial signal with query information and the return signal with the status data, the transceivers 22 and 44 transmit synchronization information in addition to the query information and the status data, advantageously reducing and/or eliminating the need for the timers 30 and 52 to synchronize again after a button 26 or 28 is pressed.

Preferably one of the buttons 26 or 28 is a vehicle door unlock button. In this example, the initial signal includes query information to open the vehicle door locks, which is transmitted from the fob transceiver 22 to the vehicle transceiver 44 and further to the electrical component 48 or 50, in this example a vehicle door lock motor, which opens the vehicle door lock, and transmits door lock open status data back to the vehicle transceiver 44. The vehicle transceiver 44 transmits the door lock open status data, which is received by the fob transceiver 22, which stores the door lock open status data and in turn transmits the door lock open status data to the LCD 32 to display the door lock open status. Preferably when the unlock button is pressed, the vehicle transceiver 44 will send the intrusion status data (not shown) of the vehicle 40 to the fob transceiver 22. The fob transceiver 22 will transmit the intrusion status data to the LCD 32, which will inform the user if anyone had accessed the vehicle 40 since the last lock function or the last door closing.

Preferably, one of the buttons 26 or 28 is a vehicle status check button. If the user presses the vehicle status check button 26 or 28 to check status, query information and status data is passed between the transceivers 22 and 44 and the electrical components 48 or 50 (as outlined above) and the LCD 32 displays the status data. In addition to the instant status check functionality, the LCD display 32 periodically displays the status data (from the activation/deactivation sequence) and gives the user a chance to review and take action. The vehicle status check button 26 or 28, therefore, allows for an instant status check on demand. This functionality is useful to alert the user that a change occurred in the status of an electrical component 48 or 50 of the vehicle 40, such as a theft alert or the like.

Preferably one of the buttons 26 or 28 is an engine remote start button. When the engine remote start button is pressed, the fob transceiver 22 transmits an initial signal including query information to start the engine (not shown) of the vehicle 40. The initial signal is transmitted from the fob transceiver 22 to the vehicle transceiver 44 and further to the electrical component 48 or 50, in this example a remote start motor, which starts the vehicle engine, and transmits engine start status data back to the vehicle transceiver 44. The vehicle transceiver 44 transmits the engine start status data, which is received by the fob transceiver 22, which stores the engine start status data and in turn transmits the engine start data to the LCD 32 to display the engine start status. After a preset period of time (for example, five minutes) the vehicle transceiver 44 transmits a reminder signal to the fob transceiver 22 that the engine has been on for a few minutes. The fob transceiver 22 stores the reminder status data and transmits the reminder status data to the LCD 32 to displays a reminder data. Additionally, the fob transceiver transmits a signal to the buzzer or the speaker 34, which emits a sound to alert the user that the vehicle engine has been running for a while.

Preferably one of the buttons 26 or 28 is a 'shift' button. When the shift button is pressed, the button sends a signal (not shown) to the microprocessor 23, to reconfigure the function associated with the other button or buttons 26 or 28 to an alternate or secondary function, for example by changing the vehicle door unlock button function to a vehicle door lock function. The shift button, therefore, provides additional functionality without requiring more buttons 26 or 28 and without requiring a larger housing for the fob 18.

In addition, the communication system 10 becomes active if a predetermined event or a status change with respect to an electrical component 48 or 50 on the vehicle 40 occurs. When the predetermined event or a status change occurs, such as a change in the status of the electrical component 48 or 50, the electrical component 48 or 50 transmits a command that includes status data (not shown) to the vehicle transceiver 44. The vehicle transceiver 44 then transmits a signal (not shown) including the status data, which is received and stored by the fob transceiver 22, which transmits the status data to the LCD 32 to display the status data. The vehicle transceiver 44 preferably transmits during the time the fob transceiver 22 is active, ensuring that the fob transceiver 22 is open for transmission to receive the signal including the status data.

For example, the change in status could be an intruder alert alarm, which triggers a signal in the electrical component 48 or 50, in this example an alert or alarm system. The signal, including intrusion status data, from the alarm system is sent to the vehicle transceiver 44, which transmits a signal that is received by the fob transceiver 22. The fob transceiver 22 stores the intrusion status data and transmits the signal to the LCD 32 to display the intrusion status data.

Because the fob transceiver 22 stores the most recently received status data, that status data may always be displayed on the LCD 32 by pushing a button, such as the button 26 or 28, that transmits a command to display the stored status data. The last status data is stored in the fob transceiver 22 and is always available to the user. Preferably, the last status data is periodically updated from periodic vehicle transmissions, such as when the transceivers 22 and 44 are open to transmission during the activation/deactivation sequence outlined above, during which the status data may be passed between the fob transceiver 22 and the vehicle transceiver 44.

Preferably, the fob transceiver 22 compares its stored status data with the recently received status data, regardless of how the fob transceiver receives the status data. The user is preferably prompted for action if a change occurred in the status of the vehicle 40 and/or if the vehicle 40 has been accessed since the last action by user. This would warn user if someone may have intruded into vehicle 40. This is also useful for remote start. In this case, the user is informed of the status of the vehicle 40 before the remote is initiated.

During each of the events wherein the communication system 10 is active as outlined above and depending on the type of status data transmitted (i.e. door lock, intrusion, etc.), the fob transceiver 22 may also send a signal to the buzzer or the speaker 34 to emit a sound in addition to sending a signal to the LCD 32 to display of the status data. The type or the volume of the sound may advantageously be varied depending on the type of status data including, but not limited to, a loud sound for vehicle intrusion status data or a softer sound for a door lock status data.

If at anytime the fob transceiver 22 is unable to communicate with the vehicle transceiver 44, a "NO LINK" message or something similar will be generated by the fob transceiver 22 and displayed on the LCD 32. In this case, if the user requests the vehicle status by pressing the vehicle status data button, the last stored status data is displayed.

The communication system 10 in accordance with the present invention advantageously provides a remote communication system for a vehicle having two-way communication capabilities as well as a power saving feature for the fob battery. The communication system 10 provides many features including visual and audible feed back (via the LCD 32 and the buzzer 34) from the vehicle 40 to the user of the fob 18. The communication system, via the status check button provides a capability for vehicle Status Confirmation, which is also a safety "Car Watch" feature. The fob transceiver 22 is active and thus consumes power only after a button 26 or 28 is depressed, or during the activation/deactivation sequence. The communication system 10 enables status data information from the vehicle 40 to be downloaded and reviewed by the user of the fob 18. The communication system 10 provides a great feature for remotely starting the vehicle engine and is operable to send remote start warning to user. The communication system 10 provides safety information via status data transmission to the user of the fob 18 when vehicle 40 is accessed illegally.

In an embodiment, the fob 18 includes four buttons, such as the buttons 26 and 28 of FIG. 1, a combination door lock and unlock button, a remote start button, a combination trunk open and status button, and a combination window and roof button. The communication system 10 in accordance with the present invention advantageously establishes a radio frequency (RF) Link between driver and vehicle, and forms an integral part of a next generation remote keyless entry system.

Figure 2:
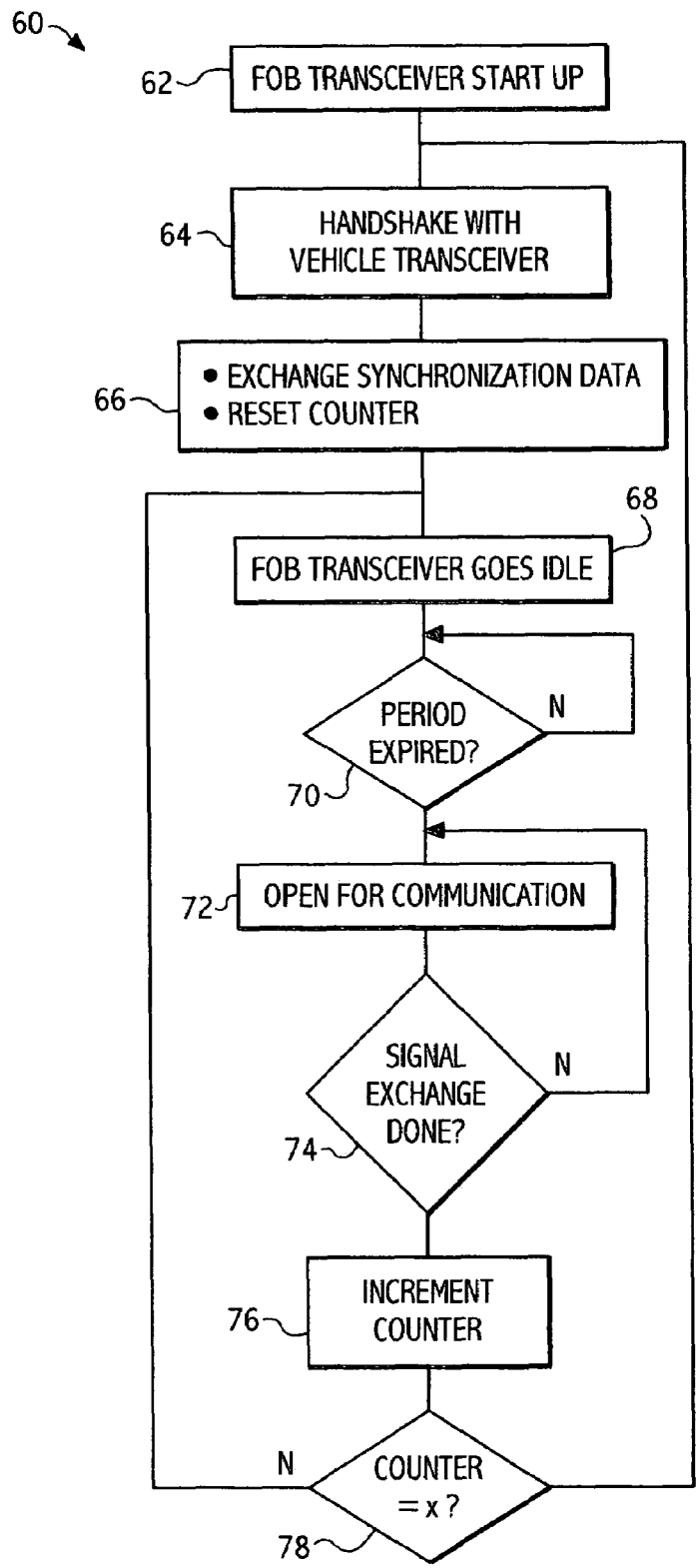
FIG. 2 is a flowchart view of a method for operating a communication system in accordance with the present invention.

Referring now to FIG. 2, a flowchart illustrating the method of operation of the communication system 10 is indicated generally at 60. In a step 62, a fob transceiver, such as the fob transceiver 22, starts up. The fob transceiver executes a 'handshake' with a vehicle transceiver, such as the vehicle transceiver 44, and a counter is reset in a step 64. The fob transceiver exchanges synchronization data with the vehicle transceiver in a step 66. After the step 66, the fob transceiver goes idle in a step 68. In a step 70, a timer, such as the fob timer 30, determines if a first predetermined period of time has expired. Once the predetermined period of time has expired, the fob transceiver is opened for communication in a step 72. In a step 74, the fob transceiver checks to verify that any signal exchange has taken place for a second predetermined period of time. Once the second predetermined period of time has expired, a counter value is incremented in a step 76. In a step 78, the counter value is checked against a predetermined value. If the counter value does not equal the predetermined value, the method 60 proceeds to the step 68 to proceed again through the steps 68 through 76. If the counter value does equal the predetermined value, the method 60 proceeds to the step 64 to proceed again through the steps 64 through 76 so that the timers are resynchronized.

Figure 3:
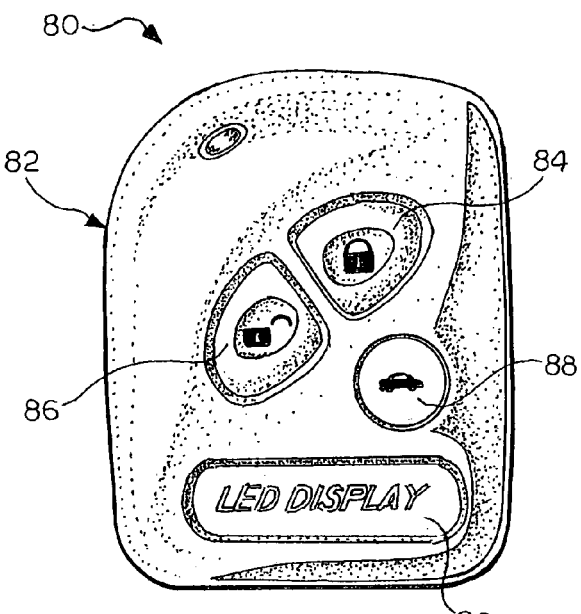
FIG. 3 is a plan view of a fob for use in a communication system in accordance with the present invention.

Referring now to FIG. 3, an embodiment of a fob suitable for use as the fob portion 12 of the communication system 10 is indicated generally at 80. The fob 80 includes a fob body 82 having a vehicle lock button 84, a vehicle unlock button 86, a vehicle trunk release button 88, and an LED 90 disposed therein. Alternatively, the buttons 82, 84, and 86 could be a vehicle status check button, a remote engine start button or the like. The fob 80 also includes a fob transceiver (not shown), such as the fob transceiver 22 of FIG. 1, and a fob battery (not shown), such as the fob battery 20 of FIG. 1, disposed therein. Each of the buttons 82, 84, and 86, and the LED 90 are electrically connected to the fob transceiver. The buttons 82, 84, and 86, and the LED 90 function as do the respective buttons 26 and 28 and the display 32 in FIG. 1, in that when a user presses one of the buttons 82, 84 or 86, this causes the fob transceiver to transmit an initial signal including query information specific to the function of the manually engaged button 82, 84 or 86. The initial signal is received by a vehicle transceiver, such as the vehicle transceiver 44 in FIG. 1, which issues a command to a vehicle electrical component, such as the components 48 or 50 in FIG. 1. After carrying out the command and in response, the electrical component transmits status data to the vehicle transceiver which, after receiving the status data, transmits a return signal including the status data. The fob transceiver receives the return signal, stores the status data, and transmits the status data to the LED 90, which displays the status data.

Figure 4:
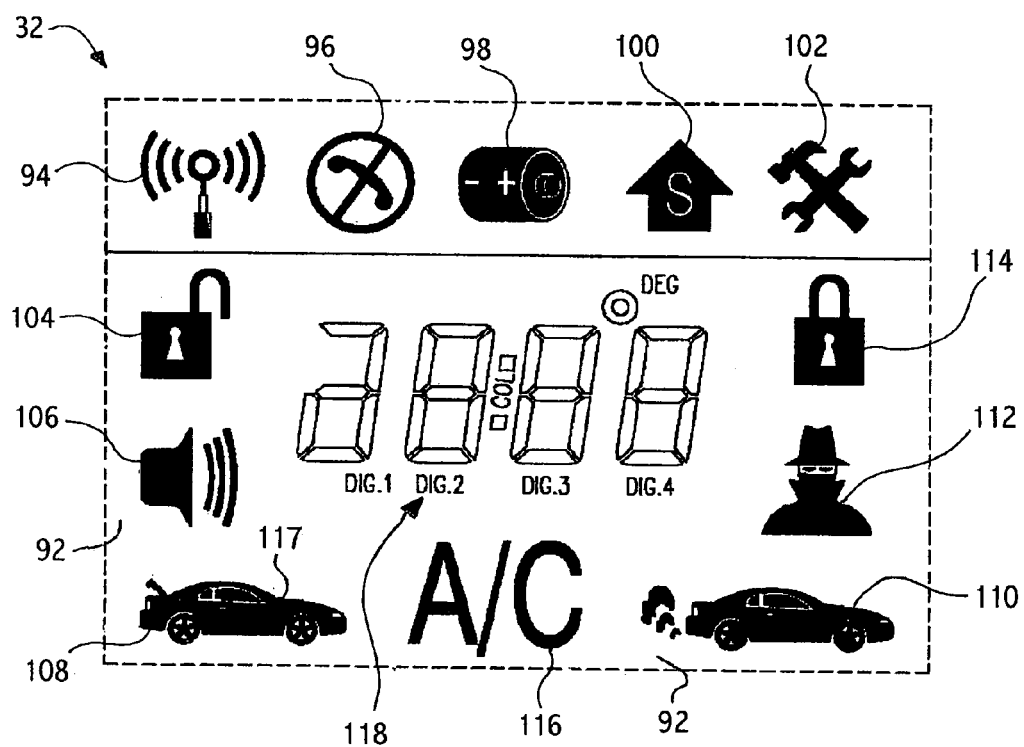
FIG. 4 is a plan view of a display for use in a communication system in accordance with the present invention.

Referring now to FIG. 4, the display 32 is shown in more detail. The display 32 is preferably a LCD, an LED, such as the LED 90 of FIG. 3, or similar display means. The display 32 includes a screen portion 92 having a plurality of locations for displaying symbols or messages corresponding to the status data received from the vehicle transceiver 22. The symbols include a transmitting and receiving symbol 94, an out of range symbol 96, a low battery symbol 98, a button secondary function selected symbol 100, a fob setup symbol 102, an unlock symbol 104, a panic symbol 106, a trunk symbol 108, a remote start symbol 110, an intrusion symbol 112, a lock symbol 114, an air conditioning symbol 116, a window symbol 117 (such as part of the trunk symbol 108), and a digit display area 118. The digit display area 118 includes a DIG. 1 symbol, a DIG. 2 symbol, a DIG. 3 symbol, a DIG. 4 symbol, a COL symbol, and a DEG symbol and can display, but is not limited to display, a countdown timer, a time of day value, a temperature value (such as vehicle interior or exterior temperature), and a tire pressure value.

In accordance with the provisions of the patent statutes, the present invention has been described in what is considered to represent its preferred embodiment. However, it should be noted that the invention can be practiced otherwise than as specifically illustrated and described without departing from its spirit or scope. For example, while the present invention has been described utilizing a remote keyless entry system, those skilled in the art will realize that the present invention may be utilized for various types of vehicle communication systems without departing from the scope of the present invention.

What is claimed is:

1. A two way remote communication system for a vehicle, comprising:
   a key fob having an electrical power source;
   a fob transceiver disposed in said key fob and electrically connected to said fob electrical power source, said fob transceiver operable to transmit and receive electrical signals;
   at least one button disposed in said key fob and electrically connected to said fob transceiver and operable to initiate a transmission of a command by said fob transceiver;
   a fob timer disposed in said key fob and electrically connected to said fob transceiver and said fob power source;
   a vehicle having an electrical power source;
   a vehicle transceiver disposed in said vehicle and electrically connected to said vehicle electrical power source, said vehicle transceiver operable to transmit and receive electrical signals;
   at least one electrical component disposed in said vehicle and electrically connected to said vehicle transceiver and operable to receive signals from and transmit commands to said vehicle transceiver;
   a vehicle timer disposed in said vehicle and electrically connected to said vehicle transceiver and said vehicle power source;
   wherein said transceivers are operable to transmit and receive electrical signals in response to commands transmitted by said at least one button and said at least one electrical component, and
   wherein said timers are synchronized to simultaneously activate and deactivate said transceivers to establish periodic time intervals when said fob transceiver is open to transmission, thereby establishing idle time for said transceivers and reducing the amount of power consumed by said fob electrical power source.

2. The communication system according to claim 1 wherein said timers simultaneously activate said transceivers for a first predetermined time interval after which said timers simultaneously deactivate said transceivers for a second predetermined time interval to complete an activation/deactivation sequence, thereby increasing the life of the fob battery.

3. The communication system according to claim 2 wherein said activation/deactivation sequence is continued for a predetermined number of sequences, after which said transceivers transmit synchronization data to ensure that said timers continue to simultaneously activate and deactivate said transceivers.

4. The communication system according to claim 1 including at least one display disposed in said key fob and electrically connected to said fob transceiver, said display operable to display information received from said fob transceiver.

5. The communication system according to claim 4 wherein said at least one display is a liquid crystal display.

6. The communication system according to claim 4 wherein when said transceivers are unable to communicate, said display displays a "NO LINK" status.

7. The communication system according to claim 1 including a buzzer disposed in said key fob and electrically connected to said fob transceiver, said buzzer operable to emit a sound after receiving a command from said fob transceiver.

8. The communication system according to claim 1 including a first microprocessor disposed in said key fob and a second microprocessor disposed in said vehicle, said first microprocessor operable to activate and deactivate said fob transceiver, said second microprocessor operable to activate and deactivate said vehicle transceiver.

9. The communication system according to claim 1 wherein said vehicle transceiver is operable to transmit a signal including status data from said at least one electrical component and said fob transceiver receives said signal and stores said status data, said stored status data available to be accessed by said fob transceiver.

10. The communication system according to claim 9 wherein said vehicle transceiver transmits said signal in response to a change in status of said at least one electrical component.

11. The communication system according to claim 9 wherein said vehicle transceiver transmits said signal in response to receiving an initial signal including query information from said fob transceiver.

12. The communication system according to claim 11 wherein said fob transceiver transmits said initial signal including query information after said at least one button is pressed, said fob transceiver remaining active for a brief predetermined period of time to detect said signal from said vehicle transceiver.

13. The communication system according to claim 9 wherein after a preset period of time, said vehicle transceiver transmits a reminder signal including reminder status data and said fob transceiver receives said reminder signal and stores said reminder status data, said stored reminder status data available to be accessed by said fob transceiver 14. The communication system according to claim 1 wherein said at least one button is a one of a status check button, a remote start button, a shift button, an engine status check button, and a tire pressure check button.

15. A method for operating a two way remote communication system for a vehicle with low battery power consumption, comprising the steps of:

a) providing a key fob having a battery, said key fob including a fob transceiver disposed in said key fob and electrically connected to said fob battery, said fob transceiver being operable to transmit and receive electrical signals;

b) providing at least one button in said key fob, said at least one button being electrically connected to said fob transceiver and operable to initiate a transmission of a command by said fob transceiver;

c) providing a fob timer in said key fob, said fob timer being electrically connected to said fob transceiver and said fob battery;

d) providing a vehicle having a battery, said vehicle including a vehicle transceiver disposed in said vehicle and electrically connected to said vehicle battery, said vehicle transceiver being operable to transmit and receive electrical signals;

e) providing at least one electrical component in said vehicle, said at least one electrical component being electrically connected to said vehicle transceiver and operable to receive signals from and transmit commands to said vehicle transceiver;

f) providing a vehicle timer in said vehicle, said vehicle timer being electrically connected to said vehicle transceiver and said vehicle battery; and g) synchronizing said timers to simultaneously activate and deactivate said transceivers to establish periodic time intervals when said transceivers are open to transmission, thereby establishing idle time for said transceivers and reducing the amount of power consumed by said fob battery.

16. The method according to claim 15 wherein step g) is performed by said timers simultaneously activating said transceivers for a first predetermined time interval after which said timers simultaneously deactivate said transceivers for a second predetermined time interval to complete an activation/deactivation sequence, thereby increasing the life of the fob battery.

17. The method according to claim 16 wherein said activation/deactivation sequence is continued for a predetermined number of sequences, after which said transceivers transmit synchronization data to ensure that said timers continue to simultaneously activate and deactivate said transceivers.

18. The method according to claim 16 wherein said vehicle transceiver is operable to transmit a signal including status data from said at least one electrical component and said fob transceiver receives said signal and stores said status data.

19. The method according to claim 18 wherein said vehicle transceiver transmits said signal in response to a change in status of said at least one electrical component.

20. The method according to claim 19 wherein said vehicle transceiver transmits said signal in response to receiving an initial signal including query information from said fob transceiver.

* * * * *